United States Patent [19]

Ishizu et al.

[11] Patent Number: 5,146,317
[45] Date of Patent: Sep. 8, 1992

[54] SIGNAL SEPARATING APPARATUS

[75] Inventors: Atsushi Ishizu; Kenta Sokawa, both of Takatsuki; Kiyoshi Imai, Ibaraki, all of Japan

[73] Assignee: Matsushita Electric Industrial Co., Ltd., Kadoma, Japan

[21] Appl. No.: 562,858

[22] Filed: Aug. 3, 1990

[30] Foreign Application Priority Data

Aug. 4, 1989 [JP] Japan .................................. 1-203264

[51] Int. Cl.⁵ .................................................. H04N 9/78
[52] U.S. Cl. .................................................. 358/31
[58] Field of Search .......................................... 358/31

[56] References Cited

U.S. PATENT DOCUMENTS 4,524,382 6/1985 Tanaka et al. .......................... 358/31
4,851,898 7/1989 Asahara .................................. 358/31
4,916,527 4/1990 Matsuo .................................... 358/31

FOREIGN PATENT DOCUMENTS 39184 3/1984 Japan .................................... 358/31
188584 8/1987 Japan .
319387 12/1989 Japan .

Primary Examiner—John W. Shepperd
Attorney, Agent, or Firm—Cushman, Darby & Cushman

[57] ABSTRACT

In the NTSC color television system, a signal having a medium level in the three signals of the bands the color sub-carrier frequency of neighboring three scanning lines is substracted from the signal of the central scanning line of the three scanning lines, the resultant signal is a luminance signal containing no cross luminance, even if the composite video signal in the three scanning lines does not maintain vertical correlation.

12 Claims, 16 Drawing Sheets

FIG.3(c)

| | Input (NTSC) | Output (Sm) | Output (Y) |
|---|---|---|---|
| Line n-1 | Sc / $\overline{Sc}$ | | |
| Line n | Sb | (sine wave) | — |
| Line n+1 | Sa / $\overline{Sa}$ | | |

FIG.3(d)

| | Input (NTSC) | Output (Sm) | Output (Y) |
|---|---|---|---|
| Line n-1 | Sc / $\overline{Sc}$ | | |
| Line n | Sb | — | (sine wave) |
| Line n+1 | Sa / $\overline{Sa}$ | | |

FIG.6(c)

| | Input (NTSC) | Output (Sm) | Output (C) | Output (Y) |
|---|---|---|---|---|
| Line n-1 | Sc, $\overline{Sc}$ | | | |
| Line n | Sb | ∿ | ∿ | — |
| Line n+1 | Sa, $\overline{Sa}$ | | | |

FIG.6(d)

| | Input (NTSC) | Output (Sm) | Output (C) | Output (Y) |
|---|---|---|---|---|
| Line n-1 | Sc, $\overline{Sc}$ | | | |
| Line n | Sb | — | ∿ | ∿ |
| Line n+1 | Sa, $\overline{Sa}$ | | | |

| | Input (NTSC) | Output (Sn) | Output (C) |
|---|---|---|---|
| Line n-1  Sc |  | | |
| Line n    Sb |  |  |  |
| Line n+1  Sa |  | | |

| | Input (NTSC) | Output (Sn) | Output (C) |
|---|---|---|---|
| Line n-1  Sc |  | | |
| Line n    Sb |  |  | — |
| Line n+1  Sa |  | | |

FIG. 8(c)

| | Input (NTSC) | Output (Sn) | Output (C) |
|---|---|---|---|
| Line n-1    Sc | | | |
| Line n      Sb | | | |
| Line n+1    Sa | | | |

FIG. 8(d)

| | Input (NTSC) | Output (Sn) | Output (C) |
|---|---|---|---|
| Line n-1    Sc | | | |
| Line n      Sb | | | |
| Line n+1    Sa | | | | ic # SIGNAL SEPARATING APPARATUS

FIELD OF THE INVENTION AND RELATED ART STATEMENT

1. Field of the Invention

The present invention relates to a signal separating apparatus for separating a luminance signal and a chrominance signal from a composite video signal in which the luminance signal and chrominance signal are multiplexed in frequency such as a NTSC format.

2. Description of the Related Art

In general, in order to separate a luminance signal and a chrominance signal rom a composite video signal of the NTSC format, a line comb filter, which utilizes phase inversion in every horizontal scanning period of a color sub-carrier, is used.

FIG. 9 is a circuit block diagram of a signal separating apparatus using the conventional line comb filter. Referring to FIG. 9, the composite video signal of the NTSC format is applied to an input terminal 101. The composite video signal is inputted to a delay element 102, and is delayed by one horizontal scanning period. The output of the delay element 102 is inputted to a delay element 103 and is delayed further one horizontal scanning period thereby. The input composite video signal is added to the output of the delay element 103 by an adder 104. The added composite video signal is reduced by half by a coefficient multiplier 105, and is applied to a subtracter 106. In the subtracter 106, the output of the coefficient multiplier 105 is subtracted from the output of the delay element 102. The output of the subtracter 106 is reduced by half by a coefficient multiplier 107, and a chrominance signal is output from a chrominance signal output terminal 111 through a band pass filter 108. On the other hand, the chrominance signal is subtracted from the output of the delay element 102 by a subtracter 109, and a luminance signal is output at a luminance signal output terminal 110.

In the composite video signal of the NTSC method, the phase of the color sub-carrier is inverted every one horizontal scanning period, and the phase of the luminance signal is identical with each horizontal scanning period. Consequently, the luminance signal component is canceled in the subtracter 106 and only the chrominance signal component is output to the chrominance signal output terminal 111.

In the above-mentioned signal separating apparatus using the line comb filter in the prior art, separation of the chrominance signal C and luminance signal Y from the composite video signal is performed by utilizing "vertical correlation" of the video signal in neighboring horizontal scanning lines. The "vertical correlation" means that the neighboring horizontal scanning lines are identical or similar with each other in the levels and phases. Therefore, when the vertical correlation is not maintained, the chrominance signal can not be completely canceled and remains in the luminance signal. Consequently, a phenomenon of "cross luminance" arises in a displayed image. Additionally, since the luminance signal can not be completely canceled from the chrominance signal, a phenomenon of "cross color" also arises. Thus, the quality of the displayed video-image is deteriorated.

OBJECT AND SUMMARY OF THE INVENTION

An object of the present invention is to provide a signal separating apparatus for canceling "cross color" and "cross luminance" in the video signal in which "vertical correlation" is not maintained.

The signal separating apparatus in accordance with the present invention comprises:

a first delay element for delaying a composite video signal by one horizontal scanning period.

a second delay element for delaying the output signal of the first delay element by one horizontal scanning period.

plural bond pass filters for selectively passing the band of the color sub-carrier frequency from the composite video signal, the output signal of the first delay element and the output signal of the second delay element, respectively, inverter circuits for inverting the composite video signal and the output of the second delay element, respectively, a medium value calculator for outputting a signal having medium value among the inverted signal of the band of the color sub-carrier frequency, the output signal of the band pass filter connected to the output of the first delay element and the inverted output signal of the band pass filter connected to the output of the second delay element, and a subtracter for outputting a luminance signal by subtracting the signal having the medium value from the output of the first delay element.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 3(a), 3(b), 3(c) and 3(d) are waveforms in separating operation of a luminance signal in the signal separating apparatus shown in FIG. 1;

FIGS. 6(a), 6(b), 6(c) and 6(d) are waveforms in separating operation of a chrominance signal and a luminance signal in the signal separating apparatus shown in FIG. 5;

FIGS. 8(a), 8(b), 8(c) and 8(d) are waveforms in separating operation of a chrominance signal in the signal separating apparatus shown in FIG. 7;

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1A:
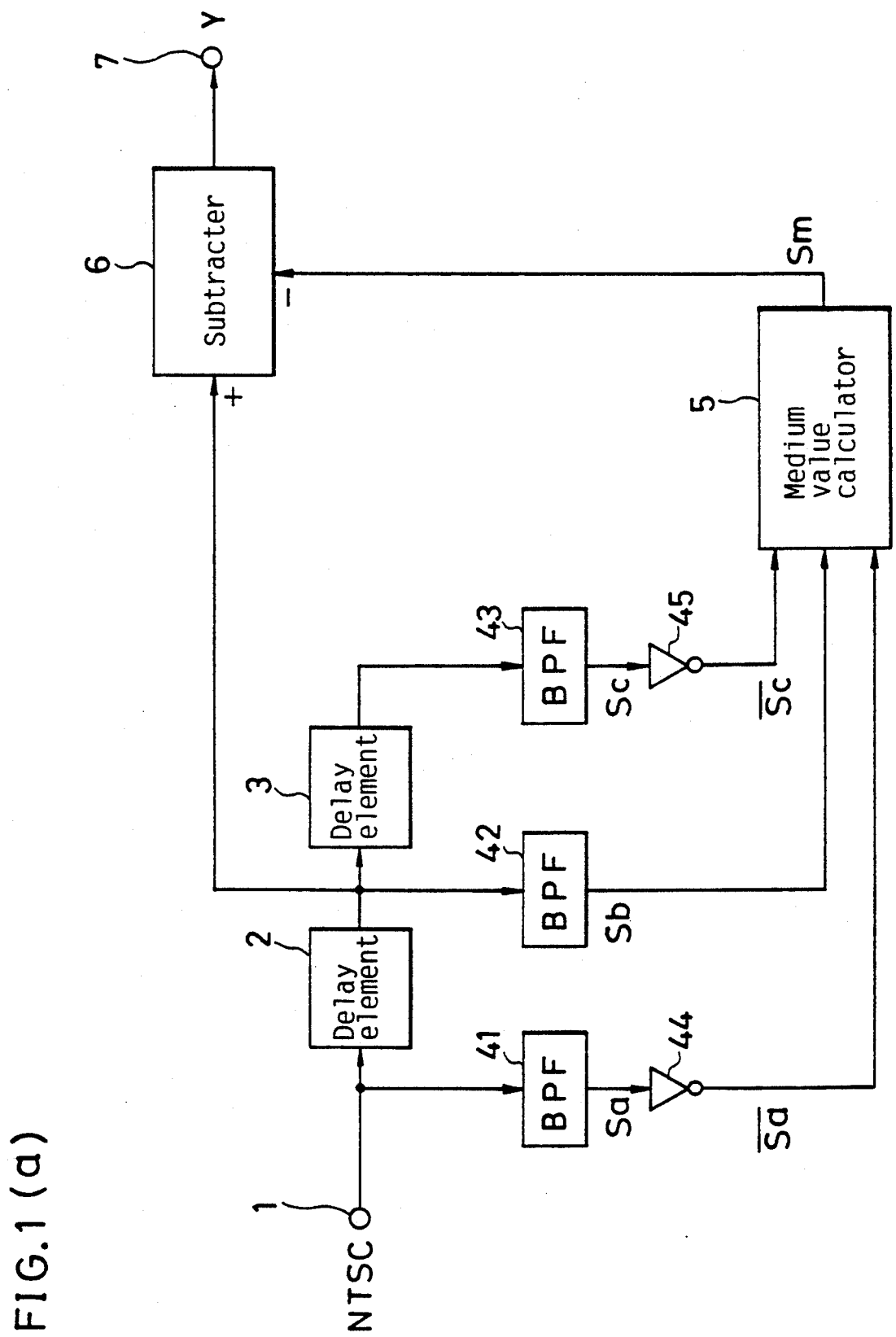
FIG. 1(a) is a circuit block diagram of a first embodiment of the signal separating apparatus in accordance with the present invention.

FIG. 1(a) is a circuit block diagram of a first embodiment of the signal separating apparatus for separating a luminance signal Y in accordance with the present invention. Referring to FIG. 1(a), a composite video signal of NTSC format is inputted to an input terminal 1. The input signal is applied to a delay element 2 by which the inputted signal is delayed by one horizontal scanning period. The output of the delay element 2 is applied to the other delay element 3 having the same function as the delay element 2. The input signal of the delay element 2, the output signal of the delay element 2 and the output of the delay element 3 are applied to a band pass filter 41, a band pass filter 42 and a band pass filter 43, respectively. These band pass filters 41, 42 and 43 pass selectively the signal of a frequency band including the color sub-carrier. The output of the band pass filters 41, 42 and 43 are represented by signals Sa, Sb and Sc, respectively. The signals Sa, Sb and Sc are high frequency components of the composite video signal, and a color sub-carrier is contained therein. The signals Sa and Sc are phase-inverted by the respective inverters 44 and 45. The outputs of the band pass filters 41 and 43 are inputted to a medium value calculator 5 through inverters 44 and 45, respectively. The outputs of the inverters 44 and 45 are represented by the signals $\overline{Sa}$ and $\overline{Sc}$, respectively. The output of the band pass filter 42 is directly inputted to a medium value calculator 5. The output Sm of the medium value calculator 5 is applied to a subtracter 6. The output of the delay element 2 is also applied to the subtracter 6, and a luminance signal Y is output at the output terminal 7 from the subtracter 6.

Operation of the signal separating apparatus shown in FIG. 1(a) is elucidated hereafter.

In the medium value calculator 5, the level of the signals $\overline{Sa}$, Sb and $\overline{Sc}$ are compared with each other, and a signal Sm having a medium value of the inputted three signals $\overline{Sa}$, Sb and $\overline{Sc}$ is output therefrom. The signal Sm is applied to the subtracter 6 and is subtracted from the output signal of the delay element 2 which is delayed by one horizontal scanning period, and a luminance signal Y is output to the output terminal 7.

Figure 2:
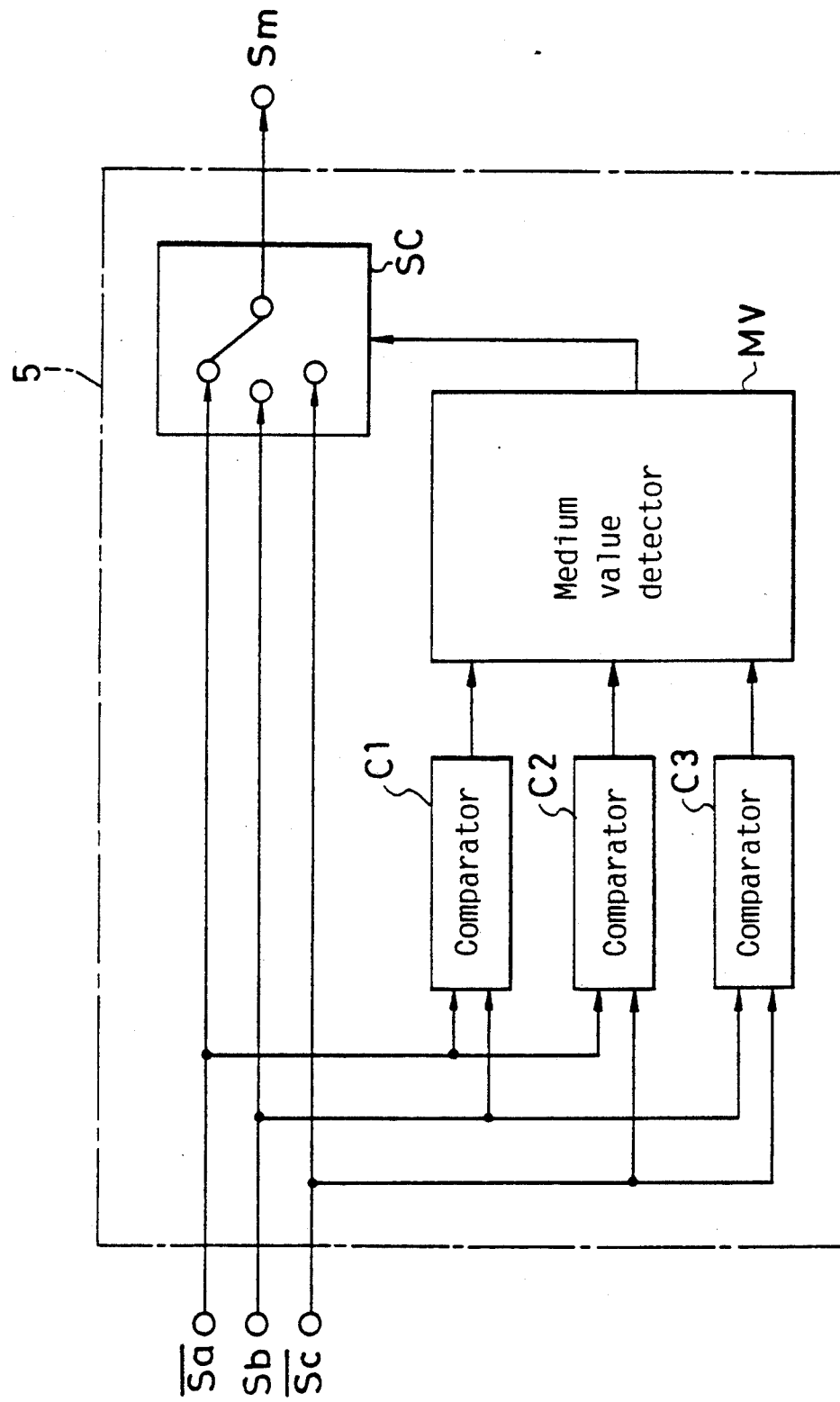
FIG. 2 is a detailed circuit block diagram of a medium value calculator in the first embodiment.

The detailed circuit block diagram of the medium value calculator 5 is shown in FIG. 2. Referring to FIG. 2, the input signals $\overline{Sa}$, Sb and $\overline{Sc}$ are compared with each other by three comparators C1, C2 and C3. The outputs of the comparators C1, C2 and C3 are applied to a medium value detector MV which is composed of gate circuits (not shown). The output of the medium value detector MV is applied to a switch circuit SC which is controlled to select a signal having a medium value.

Operation of the medium value calculator 5 is performed on the basis of the Table 1.

TABLE 1

| Case number | Order of level | | | Output of comparator | | | Selected signal Sm |
|---|---|---|---|---|---|---|---|
| | $\overline{Sa}$ | Sb | $\overline{Sc}$ | $\overline{Sa}$, Sb | $\overline{Sa}$, $\overline{Sc}$ | Sb, $\overline{Sc}$ | |
| 1 | 2 | 1 | 3 | 0 | 1 | 1 | $\overline{Sa}$ |
| 2 | 2 | 3 | 1 | 1 | 0 | 0 | $\overline{Sa}$ |
| 3 | 1 | 2 | 3 | 1 | 1 | 1 | Sb |
| 4 | 3 | 2 | 1 | 0 | 0 | 0 | Sb |
| 5 | 1 | 3 | 2 | 1 | 1 | 0 | $\overline{Sc}$ |
| 6 | 3 | 1 | 2 | 0 | 0 | 1 | $\overline{Sc}$ |
| 7 | 1 | 1 | 2 | 1 | 1 | 1 | Sb |
| 8 | 2 | 2 | 1 | 1 | 0 | 0 | $\overline{Sa}$ |
| 9 | 1 | 2 | 1 | 1 | 1 | 0 | $\overline{Sc}$ |
| 10 | 2 | 1 | 2 | 0 | 1 | 1 | $\overline{Sa}$ |
| 11 | 2 | 1 | 1 | 0 | 0 | 1 | $\overline{Sc}$ |
| 12 | 1 | 2 | 2 | 1 | 1 | 1 | Sb |
| 13 | 1 | 1 | 1 | 1 | 1 | 1 | Sb |

Definition 1: Referring to the Table 1, "case number" 1-13 of consecutive numbers represent cases in various operations, and make easy to point out a case. An "order of level" of the signals $\overline{Sa}$, Sb and $\overline{Sc}$ is represented by numerals 1, 2 and 3. The numeral 1 represents the signal having the highest level, and the numeral 3 represents the signal having the lowest level. The numeral 2 represents the medium signal having the level which is lower than the signal of the numeral 1 and is higher than the signal of the numeral 3. When there is only two levels, the higher one is represented by the numeral "1" and the lower one is represented by the numeral "2". Then, the numeral "3" is not used.

"Output of comparator" is represented by "1" or "0". In comparison of the levels of the signals $\overline{Sa}$ and Sb, when the signal $\overline{Sa}$ is larger than the signal Sb, the output of the comparator C1 is "1", on the contrary, when the signal Sb is larger than the signal $\overline{Sa}$, the output of the comparator C1 is "0".

In comparison of the levels of the signals $\overline{Sa}$ and $\overline{Sc}$, when the signal $\overline{Sa}$ is larger than the signal $\overline{Sc}$, the output of the comparator C2 is "1", on the contrary, when the signal $\overline{Sc}$ is larger than the signal $\overline{Sa}$, the output of the comparator C2 is "0".

In comparison of the levels of the signals Sb and $\overline{Sc}$, when the signal Sb is larger than the signal $\overline{Sc}$, the output of the comparator C3 is "1", on the contrary, when the signal $\overline{Sc}$ is larger than the signal Sb, the output of the comparators C3 is "0".

The "Selected signal" represents a signal which is selected by the switch circuit SC.

Figures 3A, 3B:
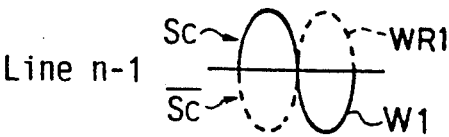

FIGS. 3(a), 3(b), 3(c) and 3(d) are waveforms for showing phase relation in operation of the signal separating apparatus of the first embodiment. FIG. 3(a) is a waveform of a chrominance signal component in case where the vertical correlation is maintained, and FIG. 3(b) is a waveform of a luminance signal component in case where the vertical correlation is not maintained. FIG. 3(c) is a waveform of a luminance signal component in case where the vertical correlation is not maintained, and FIG. 3(d) is a waveform of a luminance signal component in case where the vertical correlation is not maintained. Though the chrominance signal and the luminance signal are multiplexed in a composite video signal, in order to make understanding easy, the chrominance signal is abstracted and illustrated in FIGS. 3(a) and 3(c), and the luminance signal is abstracted and illustrated in FIGS. 3(b) and 3(d). Line n−1, line n and line n+1 represent vertically neighboring three horizontal scanning lines in a time sequence. The waveforms drawn by dotted lines represent phase-inverted signals $\overline{Sa}$ and $\overline{Sc}$.

Referring to FIG. 3(a), the input signals Sc, Sb and Sa of the neighboring three horizontal scanning lines of the line n−1, line n and line n+1 are the chrominance signal components, and the vertical correlation are maintained. The phase of the color sub-carrier is inverted every one horizontal scanning period as shown by waveforms W1, W2 and W3. Waveforms WR1 and WR3 are the inverted signals of the waveforms W1 and W3, respectively. The waveforms WR1 and WR3 of the inverted signals $\overline{Sc}$, $\overline{Sa}$ are overlapped on the waveforms W1 and W3, for easy consideration of operation. In the above-mentioned example of FIG. 3(a), since levels (hereafter implies instantaneous levels) of the signals $\overline{Sa}$, Sb and $\overline{Sc}$ are always identical with each other, the "order of level" (1, 1, 1) of the "case number" 13 in the Table 1 is applied to the case shown in FIG. 3(a) in compliance with the definition 1. Consequently, according to the Table 1, the signal Sb is output for the output Sm of the medium value calculator 5. The output Sm is shown by the waveform Sm1 in FIG. 3(a). The signal shown by the waveform Sm1 is subtracted from the output of the delay element 2 in the subtracter 6. Consequently, no chrominance signal arises at the output terminal 7, and thus there is no cross luminance.

On the other hand, referring to FIG. 3(b), the input luminance signal components of the neighboring three horizontal scanning lines are represented by waveforms W4, W5 and W6. In a similar manner mentioned above, waveforms WR4 and WR6 represent inverted input signals $\overline{Sa}$ and $\overline{Sa}$, respectively. The phases and magnitudes of the luminance signal components of the neighboring three horizontal scanning lines are identical with each other, since the vertical correlation is maintained. In this case shown in FIG. 3(b), the levels of the input signals $\overline{Sa}$, Sb and $\overline{Sc}$ are identical with that of each other, and the phase of the signal Sb is inverted to that of the signals $\overline{Sa}$ and $\overline{Sc}$. Consequently, in the first half cycle of the signals $\overline{Sa}$, Sb and $\overline{Sc}$, the level of the signal Sb is higher than the levels of the signals $\overline{Sa}$ and $\overline{Sc}$. Thus the "order of level" (2, 1, 2) of the "case number" 10 is selected in the Table 1. In the next half cycle of the signals $\overline{Sa}$, Sb and $\overline{Sc}$, the level of the signal Sb is lower than the levels of the signals $\overline{Sa}$ and $\overline{Sc}$. Thus, in compliance with the definition 1, the "order of level" (1, 2, 1) of the "case number" 9 is selected in the Table 1. Hence, either one of the signals $\overline{Sc}$ and $\overline{Sa}$ is output from the medium value calculator 5 as an output signal Sm shown by a waveform Sm2. The output signal shown by the waveform Sm2 is subtracted from the output of the delay element 2. Consequently, the signal Sm2 is subtracted from the luminance signal component shown the signal Sb in the band of the color sub-carrier frequency of the composite video signal. Then the luminance signal Y is output to the output terminal 7. The amplitude of the output signal Y is as large as twice of the output signal Sm shown by the waveform Sm2. Thus, the luminance signal component Y is enhanced in the band of the color sub-carrier frequency.

FIGS. 3(c) and 3(d) are waveforms in operation of the first embodiment for which the composite video signal does not maintain the vertical correlation. Referring to FIG. 3(c), two horizontal scanning lines of the line n−1 and line n have chrominance signal components, but the line n+1 has no chrominance signal component. Therefore, the level of the signal Sb is always identical with that of the signal $\overline{Sc}$, and the level of the signal $\overline{Sa}$ is zero. Thus, the "order of level" (1, 2, 2) of the "case number" 12 or the "order of level" (2, 1, 1) of the "case number" 11 in the Table 1 is applied to this case. Consequently, the signal Sb or $\overline{Sc}$ is output in accordance with the Table 1 as the output Sm of the medium value calculator 5. The output signal Sm is subtracted from the output signal of the delay element 2 in the subtracter 6. The luminance signal does not arise at the output terminal 7, and thus there is no cross luminance.

On the other hand, in the luminance signal components shown in FIG. 3(d), since the phase of the signal $\overline{Sc}$ is inverted to the phase of the signal Sb and the level of the signal $\overline{Sa}$ is zero on the first half cycle of the signals $\overline{Sa}$, Sb and $\overline{Sc}$. Hence, the signal Sb has the highest level, and the signal $\overline{Sc}$ has the lowest level. In the next half cycle, the signal $\overline{Sc}$ has the highest level, and the signal Sb has the lowest level. Thus, the "order of level" (2, 1, 3) of the "case number" 1 or the "order of level" (2, 3, 1) of the "case number" 2 in the Table 1 is applied to the example shown by FIG. 3(a). Consequently, the signal $\overline{Sa}$ is selected as the output of the medium value calculator 5; namely, no output signal is issued from the medium value calculator 5. Thus, the signal which is identical with the output of the delay element 2 is output to the output terminal 7Y as a luminance signal component, but there is no chrominance component in the output.

As mentioned above, according to the first embodiment, the luminance signal having no cross luminance is separated from the composite video signal even when the vertical correlation is not maintained as shown in FIGS. 3(c) and 3(d). Additionally, since a luminance signal which is enhanced in the band of the color sub-carrier is obtained when the vertical correlation is maintained as shown in FIG. 3(b), and contour enhancement can be accomplished.

The waveform and phase difference of the chrominance signal and luminance signal in the composite video signal shown in FIGS. 3(a), 3(b), 3(c) and 3(d) are simplified for easy understanding. Even when a various waveforms of these signals arise in actual situation, only the luminance signal is output from the output terminal 7.

Figure 4A:
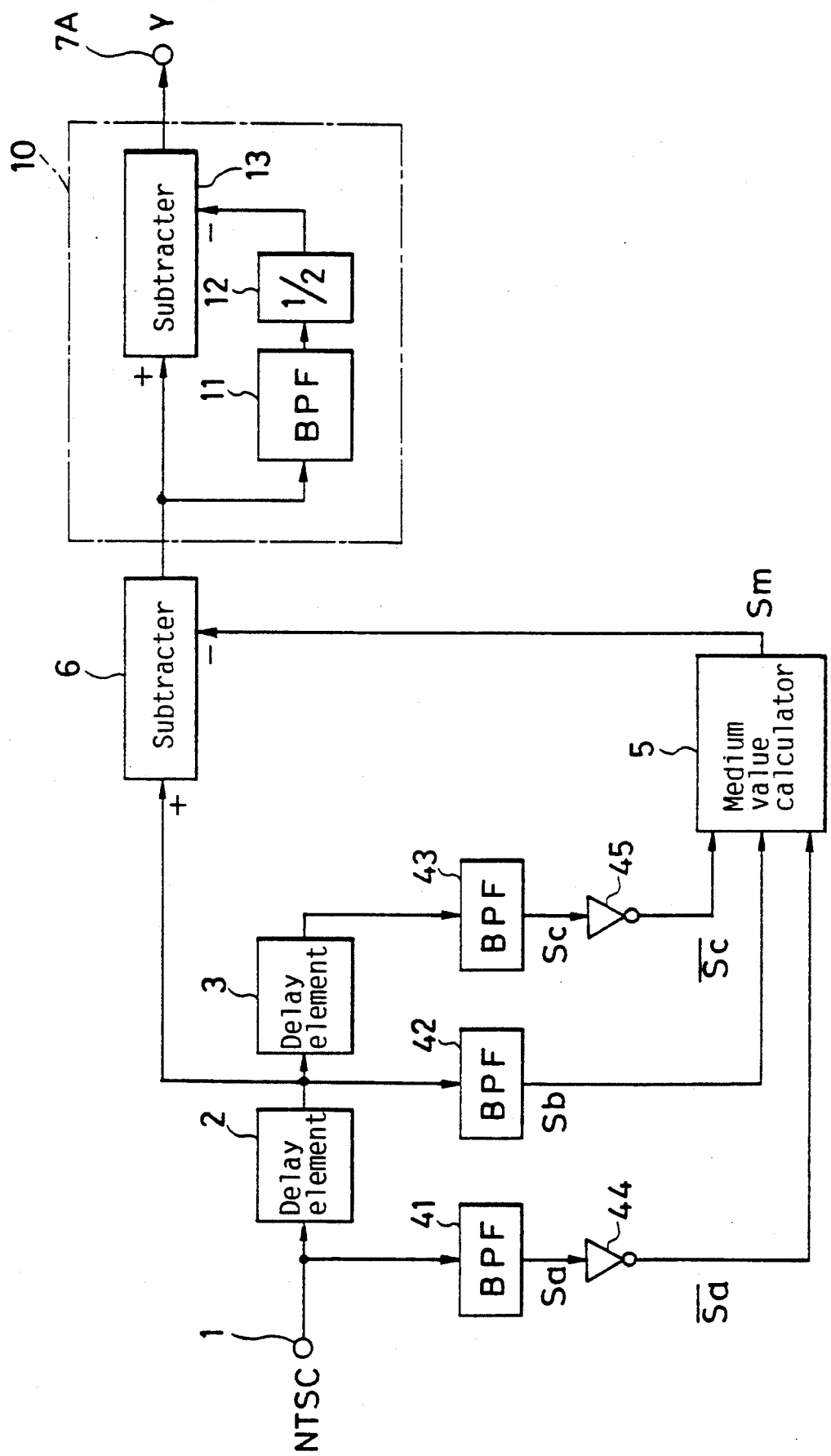
FIG. 4(a) is a circuit block diagram of a second embodiment of the signal separating apparatus in accordance with the present invention.
Figure 4B:
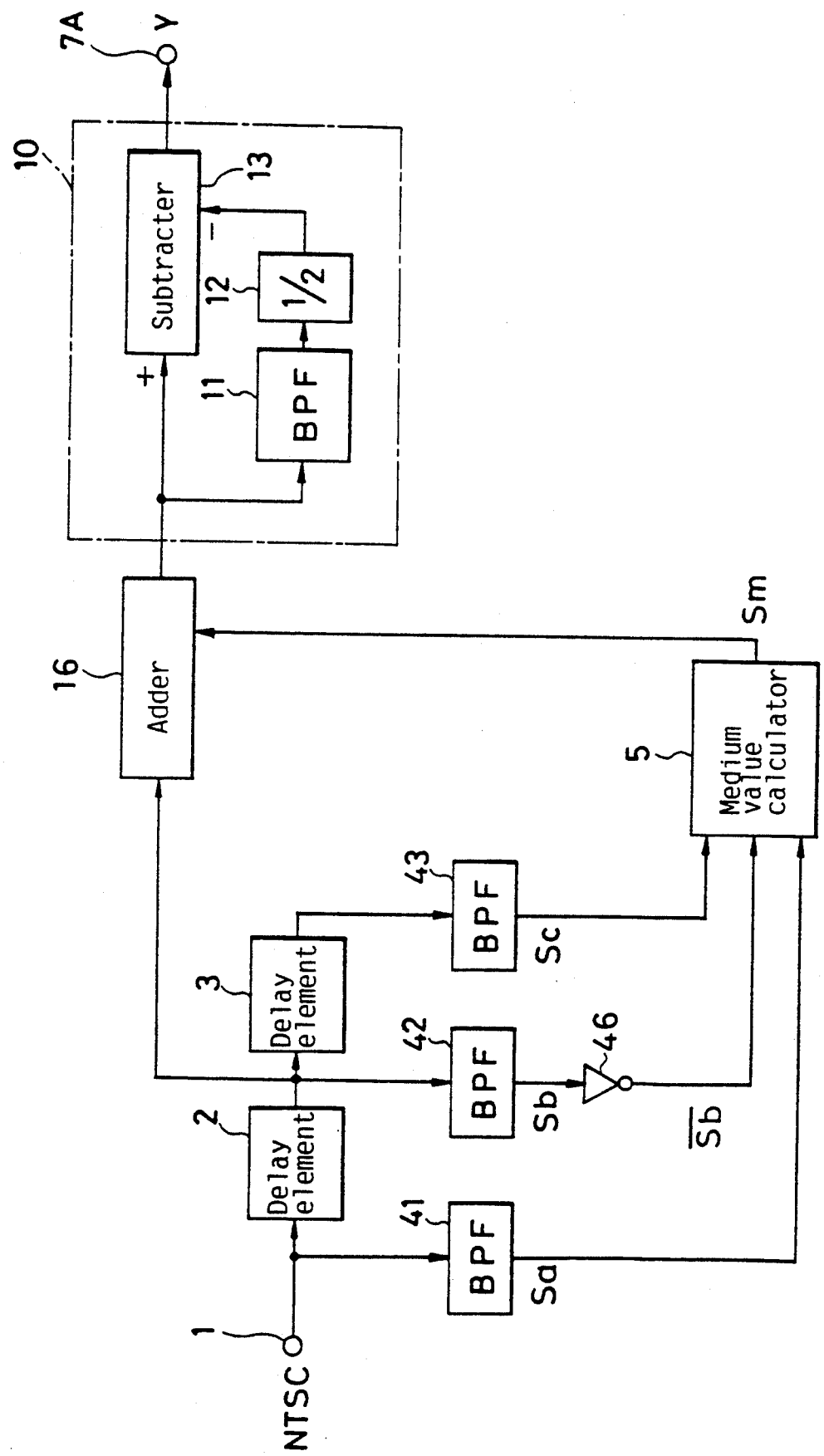
FIG. 4(b) is a circuit block diagram of the other type of the second embodiment of the signal separating apparatus in accordance with the present invention.

As mentioned above, the contour enhancement in the horizontal direction is produced in accompaniment with the separation of the luminance signal in the signal separating apparatus of the first embodiment shown in FIG. 1(a). However, there is some case where a luminance signal with the contour enhancement is not desirable. In such case, a uniform frequency characteristic is required, and hence separation of the luminance signal having the uniform frequency characteristic must be realized. A second embodiment shown in FIGS. 4(a) and 4(b) is devised to provide a luminance signal without the contour enhancement in accordance with the present invention.

Figure 1B:
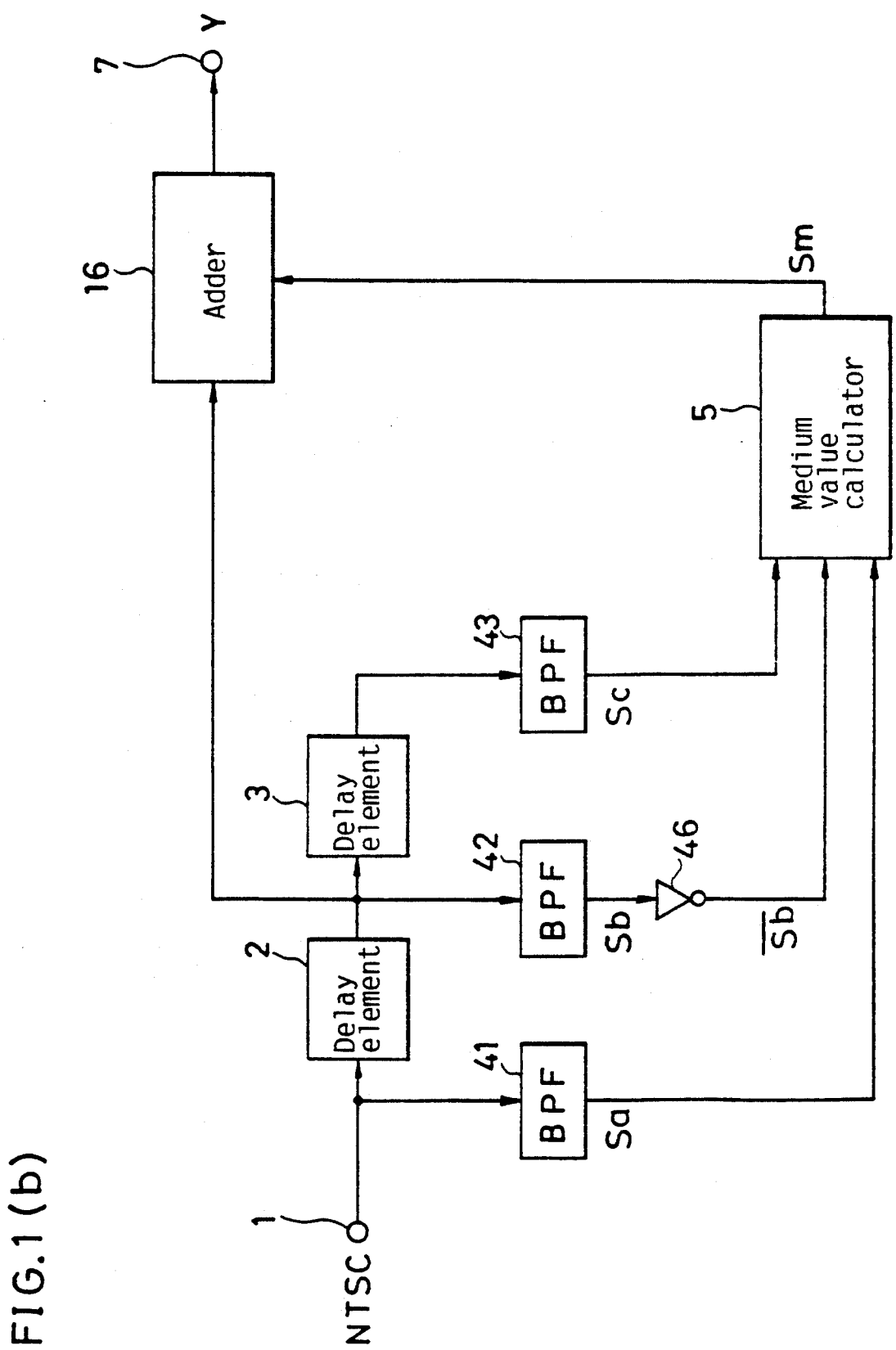
FIG. 1(b) is a circuit block diagram of the other type of the first embodiment of the signal separating apparatus in accordance with the present invention.

FIG. 1(b) is a circuit block diagram of the other modified version of the first embodiment. Referring to FIG. 1(b), the output signals Sa and Sc of the band pass filters 41 and 43 are directly inputted to the medium value calculator 5. The output signal Sb of the band pass filter 42 is inverted by an inverter 46 and is inputted to the medium value calculator 5. Then, the output Sm of the medium value calculator 5 is added to the output of the first delay element 2 in an adder 16. The remaining components functioning in the same manner as in the arrangement of FIG. 1(a) are designated by like numerals as used with corresponding parts shown in FIG. 1(a).

In operation of the said other modified type of the first embodiment shown in FIG. 1(b), since the signals Sa, $\overline{Sb}$ and Sc are inputted to the medium value calculator 5, the signals $\overline{Sa}$, Sb and $\overline{Sc}$ in the Table 1 are replaced with the signals Sa, $\overline{Sb}$ and Sc, respectively. The Table 2 is to be applied in place of the Table 1 to the operation of the said other modified type of the first embodiment shown in FIG. 1(b).

TABLE 2

| Case number | Order of level |    |    | Output of comparator |    |    | Selected signal |
|---|---|---|---|---|---|---|---|
|   | Sa | $\overline{Sb}$ | Sc | Sa, Sb | Sa, Sc | Sb, Sc | Sm |
| 1  | 2 | 1 | 3 | 0 | 1 | 1 | Sa |
| 2  | 2 | 3 | 1 | 1 | 0 | 0 | Sa |
| 3  | 1 | 2 | 3 | 1 | 1 | 1 | $\overline{Sb}$ |
| 4  | 3 | 2 | 1 | 0 | 0 | 0 | $\overline{Sb}$ |
| 5  | 1 | 3 | 2 | 1 | 1 | 0 | Sc |
| 6  | 3 | 1 | 2 | 0 | 0 | 1 | Sc |
| 7  | 1 | 1 | 2 | 1 | 1 | 1 | $\overline{Sb}$ |
| 8  | 2 | 2 | 1 | 1 | 0 | 0 | Sa |
| 9  | 1 | 2 | 1 | 1 | 1 | 0 | Sc |
| 10 | 2 | 1 | 2 | 0 | 1 | 1 | Sa |
| 11 | 2 | 1 | 1 | 0 | 0 | 1 | Sc |
| 12 | 1 | 2 | 2 | 1 | 1 | 1 | $\overline{Sb}$ |
| 13 | 1 | 1 | 1 | 1 | 1 | 1 | $\overline{Sb}$ |

Moreover, into FIGS. 3(a), 3(b), 3(c) and 3(d), a waveform of the signal $\overline{Sb}$ which is the phase-inverted waveform of the signal Sb is added, and the waveform WR1. WR3, WR4 and WR6 of the signals $\overline{Sa}$ and $\overline{Sb}$ are deleted. Then, in the description, the signals $\overline{Sa}$, Sb and $\overline{Sc}$ are replaced with the signals Sa, $\overline{Sb}$ and Sc, respectively. By the above-mentioned changes, FIGS. 3(a), 3(b), 3(c) and 3(d) are applicable to the operation of the type of the first embodiment shown in FIG. 1(b). Thus, the same result as that of the first embodiment shown in FIG. 1(a) is realizable thereby.

FIG. 4(a) is a circuit block diagram of the signal separating apparatus of the second embodiment. Referring to FIG. 4(a), a trap filter 10 is connected between the output of the subtracter 6 and the output terminal 7. The remaining components functioning in the same manner as in the arrangement of FIG. 1(a) are designated by like numerals as used with corresponding parts shown in FIG. 1(a) and therefore will not be described. The luminance signal from the subtracter 6 is applied to a band pass filter 11 and a subtracter 13 in the trap filter 10. The band of the color sub-carrier in the output of the subtracter 6 is filtered by the band pass filter 11 and is applied to a coefficient multiplier 12 so that the amplitude is halved. The output of the coefficient multiplier 12 is applied to the subtracter 13 and is subtracted from the luminance signal applied from the subtracter 6. Consequently, the luminance signal having a twice amplitude in the band of the color sub-carrier is reduced by half in the amplitude. Thus, the enhancement of the luminance signal Y in the band of the color sub-carrier frequency is removed, and the luminance signal having the uniform frequency characteristic is output from the output terminal 7A. Thus, the contour enhancement in the horizontal direction is eliminated.

FIG. 4(b) is a circuit block diagram of the other type of the second embodiment. Referring to FIG. 4(b), the output signals Sa and Sc of the band pass filters 41 and 43 are directly inputted to the medium value calculator 5. The output signal Sb of the band pass filter 42 is inverted by the inverter 46 and is inputted to the medium value calculator 5. Then, the output Sm of the medium value calculator 5 is added to the output of the first delay element 2 in an adder 16. The remaining components functioning in the same manner as in the arrangement of FIG. 4(a) are designated by like numerals as used with corresponding parts shown in FIG. 4(a).

In operation of the type of the second embodiment shown in FIG. 4(b), the Table 2 is applied in place of the Table 1. Then, in the description, the signals $\overline{Sa}$, Sb and $\overline{Sc}$ are replaced with the signals Sa, $\overline{Sb}$ and Sc, respectively. The Table 2 is applicable to the operation of the type of the second embodiment shown in FIG. 4(b). Thus, the same result as that of the second embodiment shown in FIG. 4(a) is realizable.

Figure 5A:
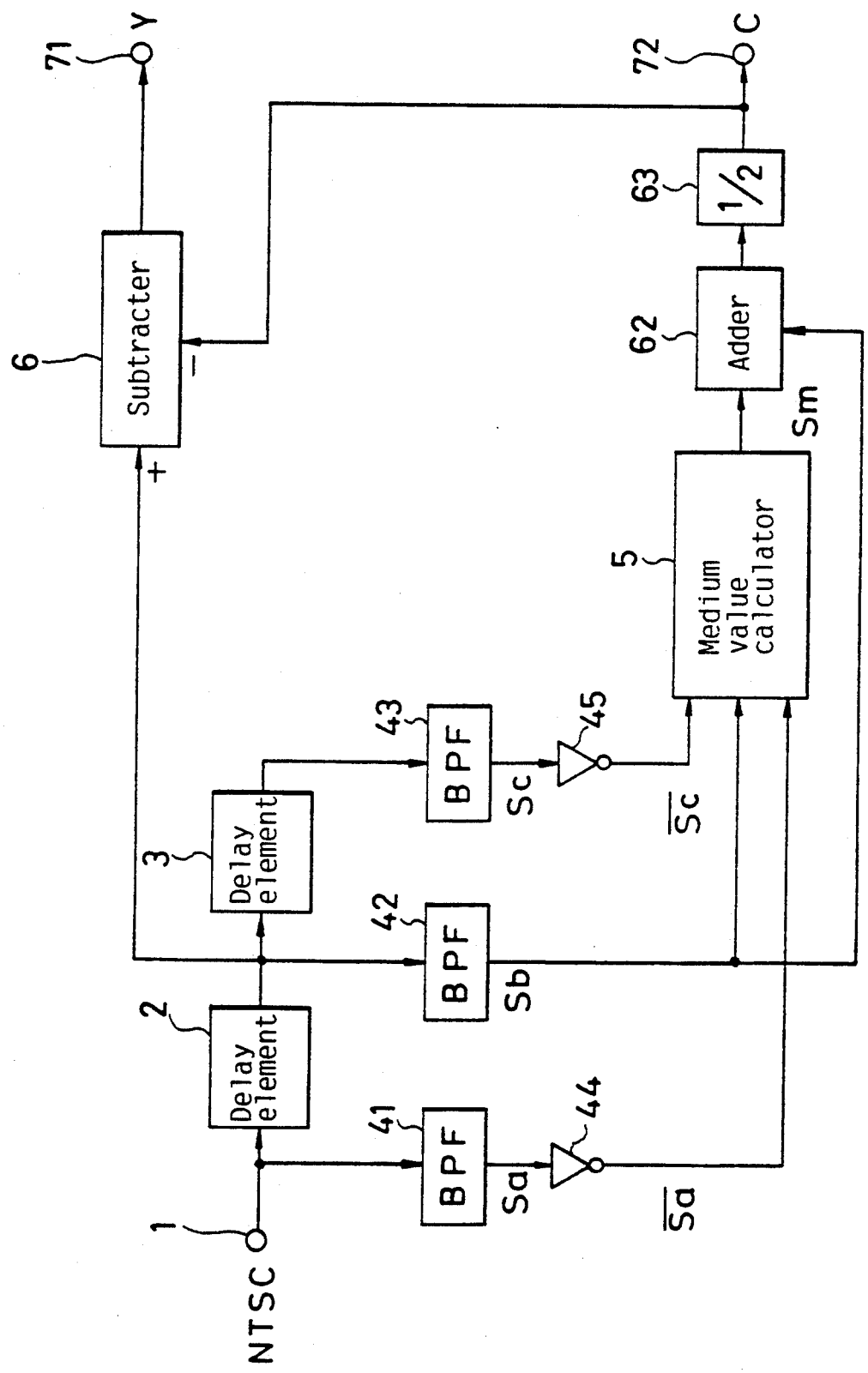
FIG. 5(a) is a circuit block diagram of a third embodiment of the signal separating apparatus in accordance with the present invention.

FIG. 5(a) is a circuit block diagram of a third embodiment in accordance with the present invention. Referring to FIG. 5(a), the output of the medium value calculator 5 is applied to an adder 62. The signal Sb is also applied to the adder 62 and is added to the output of the medium value calculator 5. The output of the adder 62 is inputted to a coefficient multiplier 63 and is halved thereby. Thus a chrominance signal is output to an output terminal 72 from the coefficient multiplier 63. The output of the coefficient multiplier 63 is also applied to the subtracter 6. The remaining components in FIG. 5(a) which function in the same manner as in the arrangement of FIG. 1 are designated by like numerals as used with corresponding parts shown in FIG. 1(a), and therefore will not be described.

Figure 6A:
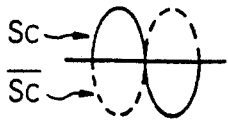
Figure 6B:
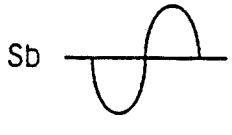

FIGS. 6(a), 6(b), 6(c) and 6(d) are waveforms in operation of the third embodiment. When the vertical correlation is maintained, the operation for separating a chrominance signal component is as shown in FIG. 6(a), and the operation for selecting a luminance signal component is as shown in FIG. 6(b). The phase of the color sub-carrier is inverted in every horizontal scanning, and the signals $\overline{Sa}$, Sb and $\overline{Sc}$ which are inputted to the medium value calculator 5 have the same magnitude as shown in FIG. 6(a). Consequently, the output signal Sm is identical with the signal Sb in compliance with definition 1 (order of level (1, 1, 1) of the case number 13, in the Table 1). Subsequently, the output signal Sm is applied to the adder 62, and is added to the signal Sb. The output of the adder 62 is inputted to a coefficient multiplier 63 and is halved thereby. Thus, a chrominance signal is output from the output terminal 72. Then, the chrominance signal is applied to the subtracter 6 and is canceled. Consequently, the chrominance signal is not output from the output terminal 71.

On the other hand, as shown in FIG. 6(b), the respective phases of the luminance signal components Sa, Sb and Sc of every scanning lines are identical with each other, and the amplitude of the signal $\overline{Sa}$ is identical with that of the signal $\overline{Sc}$. Levels of these signals $\overline{Sa}$ and $\overline{Sc}$ are compared with the signal Sb, and the signal $\overline{Sa}$ or the signal $\overline{Sc}$ is output as a medium value signal Sm in compliance with the definition 1 (order of level (2, 1, 2) of the "case number" 10 or (1, 2, 1) of the case number 9 in the Table 1). Consequently, the signal Sm is identical with the signal Sb in amplitude and is opposite to each other in phase, hence not output signal is issued from the output terminal 72. On the other hand, the luminance signal is output from the output terminal 71. In the aforementioned operations shown in FIGS. 6(a) and 6(b), the chrominance signal and luminance signal are separated from the composite video signal.

In the event that the inputted composite video signal does not maintain the vertical correlation and a chrominance signal component is selected, for example as shown in FIG. 6(c), the composite video signals are output during the horizontal scanning periods of the line n−1 and n, but no component video signal is output during the horizontal scanning period of the line n+1. The output signal Sm of the medium value calculator 5 is identical with the signal $\overline{Sc}$ or the signal Sb, in compliance with the definition 1 (order of level (1, 2, 2) of the case number 12 or (2, 1, 1) of the "case number" 11 in the Table 1). Consequently, the chrominance signal is output from the output terminal 72. The chrominance signal is applied to the subtracter 6 which subtract the chrominance signal from the output signal of the delay element 2. Thus the chrominance signal is canceled in the subtracter 6 and is not output from the output terminal 71. Consequently, the cross luminance is prevented, when the vertical correlation is not maintained.

In the luminance signal component, as shown in FIG. 6(d), since the signal Sm which is output from the medium value calculator 5 is zero in compliance with the definition 1 (order of level (2, 1, 3) of the case number 1 or (2, 3, 1) of the case number 2 in the Table 1). A signal containing a luminance signal component in the same degree as in the conventional line comb-filter type signal separating apparatus is output to the output terminal 72. Then, the luminance signal halved in amplitude is output to the output terminal 71. Therefore, when the vertical correlation is not maintained, a little cross color arises at the boundary part of a displayed image. The chrominance signal and luminance signal are separated from the composite video signal without making the cross luminance. The above-mentioned problem of the slight cross color can be overcome by the following fourth embodiment.

Figure 5B:
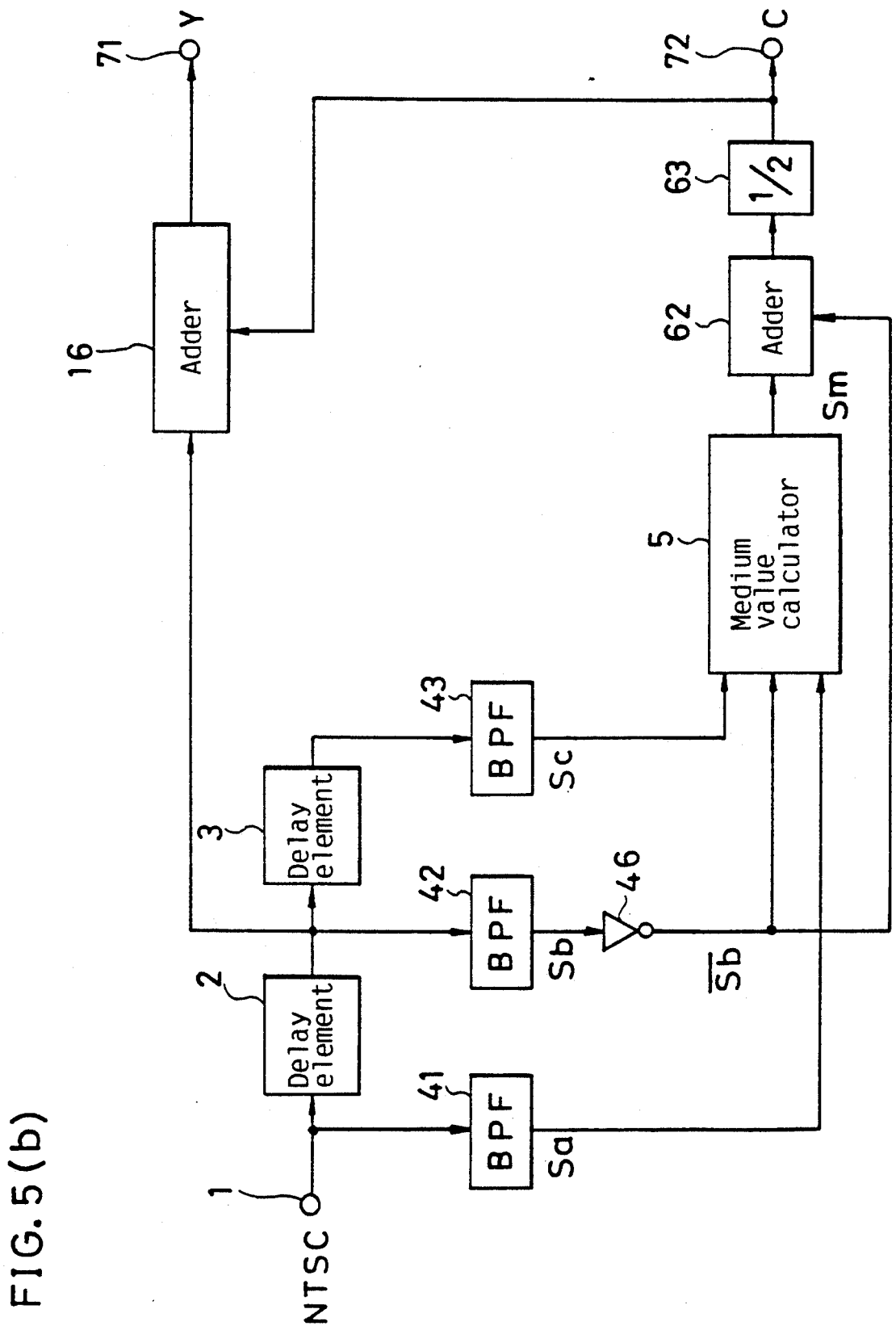
FIG. 5(b) is a circuit block diagram of the other type of the third embodiment of the signal separating apparatus in accordance with the present invention.

FIG. 5(b) is a circuit block diagram of the other type of the third embodiment. Referring to FIG. 5(b), the output signals Sa and Sb of the band pass filters 41 and 43 are directly inputted to the medium value calculator 5. The output signal Sb of the band pass filter 42 is inverted by the inverter 46 and is inputted to the medium value calculator 5. Then, the output Sm of the medium value calculator 5 is added to the output of the first delay element 2 in an adder 16. The remaining components which function in the same manner as in the arrangement of FIG. 5(a) are designated by like numerals as used with corresponding parts shown in FIG. 5(a).

In operation of the said other type of the third embodiment shown in FIG. 5(b), the Table 2 is applied. Then, in the description, the signals $\overline{Sa}$, Sb and $\overline{Sc}$ are replaced by the signals Sa, $\overline{Sb}$ and Sc, respectively. Moreover, into FIGS. 6(a), 6(b), 6(c) and 6(d), a waveform $\overline{Sb}$ which is the phase-inverted waveform of the signal Sb is added, and the waveforms of the signals $\overline{Sa}$ and $\overline{Sb}$ shown by dotted lines are deleted. Then, in the description, the signals $\overline{Sa}$, Sb and $\overline{Sc}$ are replaced with the signals Sa, $\overline{Sb}$ and Sc, respectively. By the above-mentioned changes, FIGS. 6(a), 6(b), 6(c) and 6(d) are applicable to the operation of the type of the third embodiment shown in FIG. 5(b). Thus, the same result as that of the second embodiment shown in FIG. 5(a) is realizable.

Figure 7A:
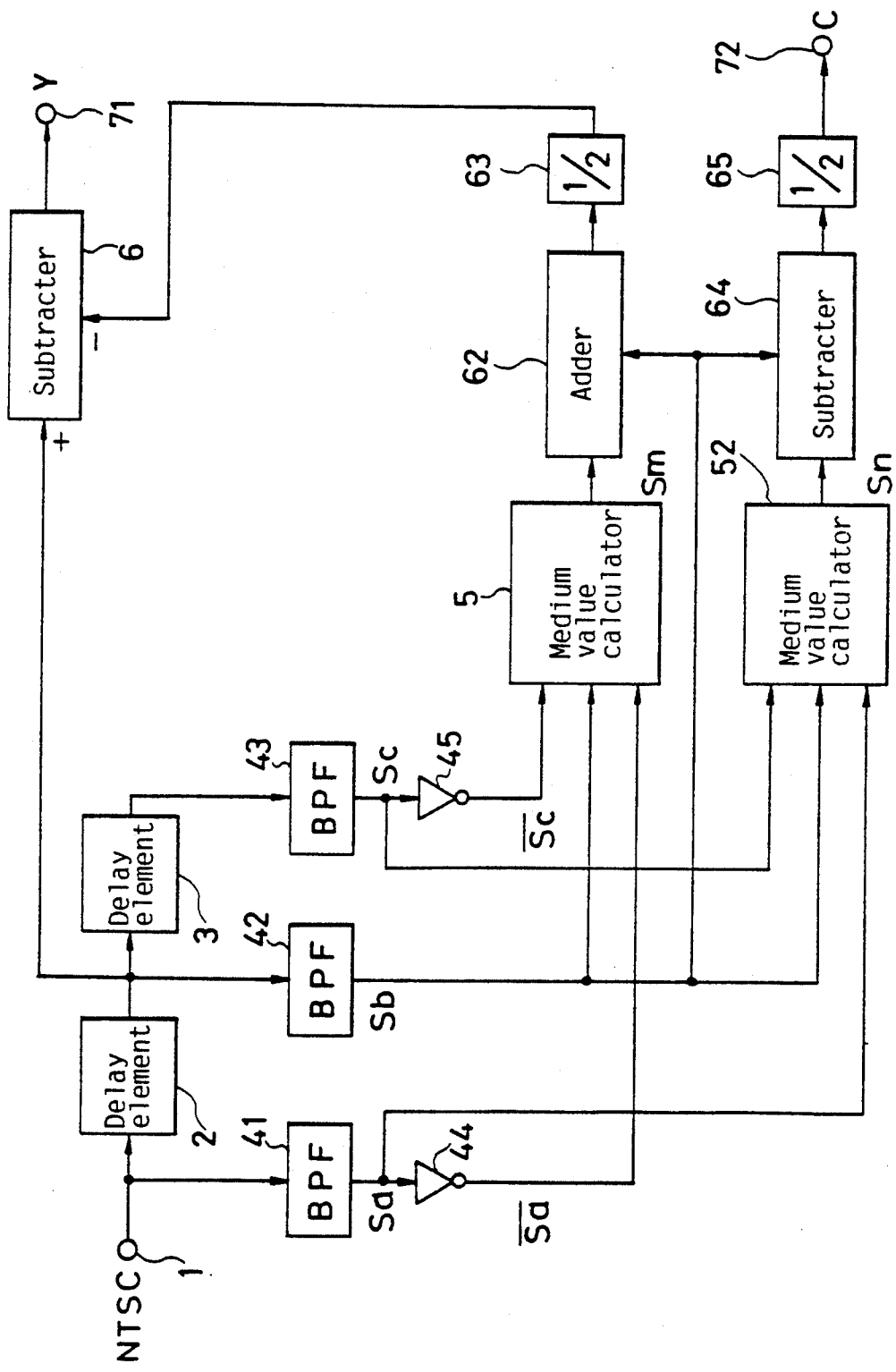
FIG. 7(a) is a circuit block diagram of a fourth embodiment of the signal separating apparatus in accordance with the present invention.

FIG. 7(a) is a circuit block diagram of the fourth embodiment of the signal separating apparatus in accordance with the present invention. Referring to FIG. 7(a), a medium valve calculator 52, a subtracter 64 and a coefficient multiplier 65 are added to the circuit shown in FIG. 5(a). The remaining components which function in the same manner as in the arrangement of FIG. 5(a) are designated by like numerals as used with corresponding parts shown in FIG. 5(a), and therefore will not be described. The signals Sa, Sb and Sc are inputted to the medium value calculator 52. The output Sn of the medium value calculator 52 is applied to the subtracter 64. The signal Sb is also applied to the subtracter 64 and the output Sn is subtracted from the signal Sb. The output of the subtracter 64 is inputted to the coefficient multiplier 65 and a chrominance signal C is output to an output terminal 72.

Figure 8A:
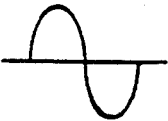
Figure 8A:
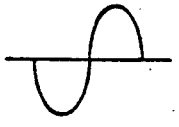
Figure 8A:
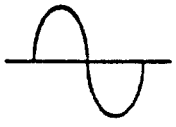
Figure 8A:
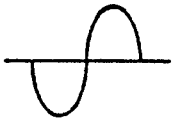
Figure 8A:
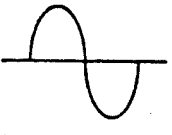

Operation of the fourth embodiment is elucidated hereafter. When the vertical correlation is maintained, the phase of the color sub-carrier of the chrominance signal component is inverted every horizontal scanning period as shown in FIG. 8(a), and the signals Sa and Sc which are inputted to the medium value calculator 52 have the same amplitude. Therefore, the output signal Sn has the same amplitude as the signal Sb and is opposite in phase in compliance with the definition 1 (order of level (1, 2, 1) of the case number 9 or (2, 1, 2) of the case number 10 in the Table 1). Then, the signal Sn is subtracted from the signal Sb in the subtracter 64 and is halved by the coefficient multiplier 65. Thus the chrominance signal which is substantially identical with the signal Sb of the line n is output from the output terminal 72.

Figure 8B:
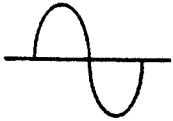
Figure 8B:
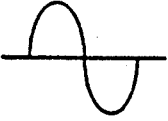
Figure 8B:
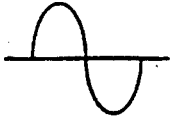
Figure 8B:
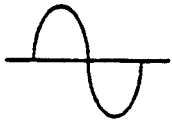
Figure 9:
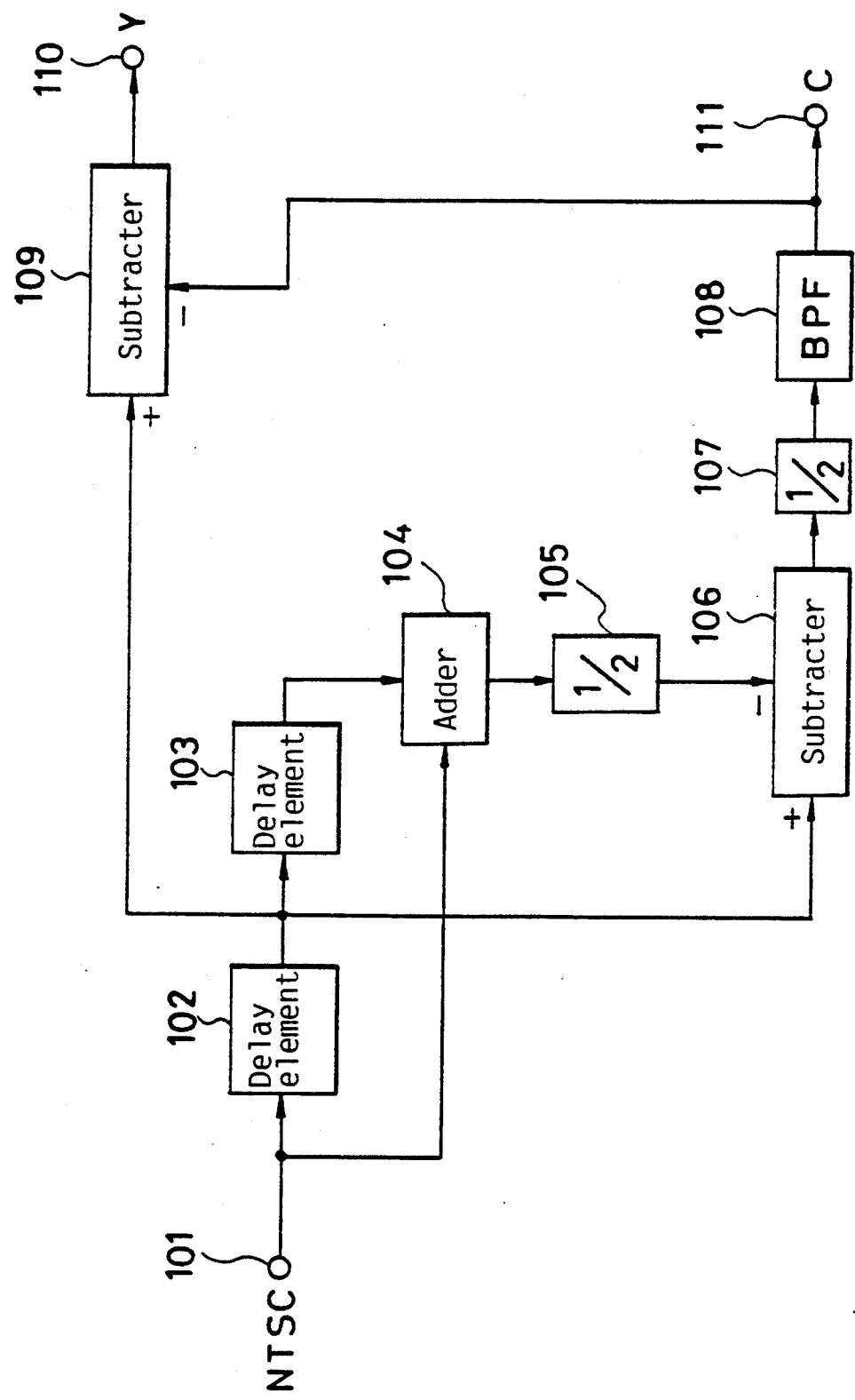
FIG. 9 is the block diagram of the signal separating apparatus using the line comb filter in the prior art.

On the other hand, since the phases of the luminance signal components are identical with each other in every horizontal scanning lines and the levels of the signals Sa, Sb and Sc which are inputted to the medium value calculator 52 are identical with each other as shown in FIG. 8(b), the output signal Sn is identical with the signal Sb of the line n is compliance with the definition 1 (order of level (1, 1, 1) of the case number 13 in the Table 1). The signal Sn is subtracted from the signal Sb in the subtracter 64 and is canceled. Thus the luminance signal component is not output to the output terminal 72.

In the event of the composite video signal in which the vertical correlation is not maintained as shown in FIG. 8(c), since the output signal which is output from the medium value calculator 52 is zero in compliance with the definition 1 (order of level (2, 3, 1) of the case number 2 or (2, 1, 3) of the case number 1 in the Table 1), the chrominance signal C which is halved in the amplitude of the chrominance signal of the horizontal scanning line n is output from the output terminal 72. As to the luminance signal component shown in FIG. 8(d), since the signal Sn which is output from the medium value calculator 52 is identical with the signal Sb of the line n in a similar manner of the case in which the vertical correlation is maintained, the luminance signal component Y is not output from the output terminal 72, and the cross color does not arise.

Figure 7B:
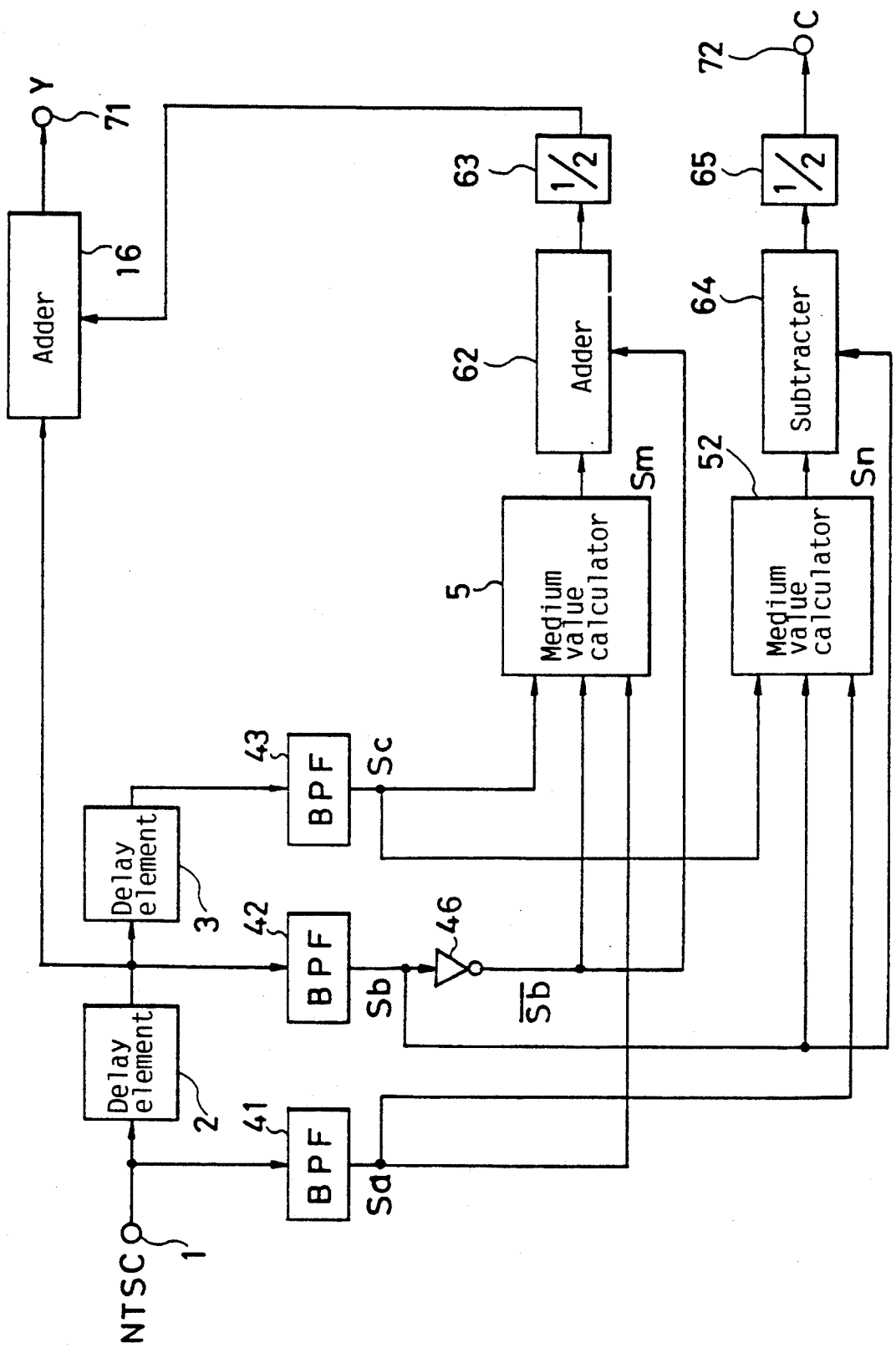
FIG. 7(b) is a circuit block diagram of the other type of the fourth embodiment of the signal separating apparatus in accordance with the present invention.

FIG. 7(b) is a circuit block diagram of the other type of the fourth embodiment. Referring to FIG. 7(b), the output signals Sa and Sb of the band pass filters 41 and 43 are directly inputted to the medium value calculator 5. The output signal Sb of the band pass filter 42 is inverted by the inverter 46 and is inputted to the medium value calculator 5. Then, the output Sm of the medium value calculator 5 is added to the output of the first delay element 2 in an adder 16. The remaining components which function in the same manner as in the arrangement of FIG. 7(a) are designated by like numerals as used with corresponding parts shown in FIG. 7(a).

In the fourth embodiment shown in FIG. 7(b), the Table 2 is applied in place of the Table 1. Moreover, into FIGS. 8(a), 8(b), 8(c) and 8(d), a waveform $\overline{Sb}$ which is the phase-inverted waveform of the signal Sb is added, and the waveforms of the signals $\overline{Sa}$ and $\overline{Sb}$ shown by dotted lines are deleted. Then, in the description, the signals $\overline{Sa}$, Sb and $\overline{Sc}$ are replaced with the signals Sa, $\overline{Sb}$ and Sc, respectively. By the above-mentioned change FIGS. 8(a), 8(b), 8(c) and 8(d) are applicable to the operation of the type of the fourth embodiment shown in FIG. 8(b). Thus, the same result as the fourth embodiment shown in FIG. 7(a) is realizable thereby.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A signal separating apparatus comprising:
   a first delay element for delaying a composite video signal by one horizontal scanning period,
   a second delay element for delaying an output signal of the first delay element by one horizontal scanning period,
   plural band pass filters for selectively passing a band of a color sub-carrier frequency from the composite video signal, the output signal of the first delay element and an output signal of the second delay element, respectively,
   inverter circuits for inverting output signals of the band pass filters filtering the composite video signal and the output signal of the second delay element, respectively,
   a medium value calculator for outputting a signal having a medium value from among the inverted output signal of the band pass filter filtering the composite video signal, output signal of the ban pass filter filtering an output signal of the first delay element, and the inverted output signal of the band pass filter filtering the output signal of the second delay element, and
   a subtracter for outputting a luminance signal by subtracting the medium value signal from the output signal of the first delay element.

2. A signal separating apparatus in accordance with claim 1, wherein the medium value calculator comprises:
   plural comparators each for comparing levels of two signals selected from among the inverted output signal of the band pass filter filtering the composite video signal, the output signal of the band pass filter filtering the output signal of the first delay element, and the inverted signal of the output signal of the band pass filter filtering the output signal of the second delay element,
   a medium value detector for detecting which one of the compared signals is a medium value based on comparator output signals; and
   switch means for selecting the medium value signal based on a medium value detector output signal.

3. A signal separating apparatus in accordance with claim 1, further comprising:
   means for reducing an amplitude of a luminance signal of the band of the color sub-carrier frequency connected to an output of the subtracter.

4. A signal separating apparatus in accordance with claim 3, wherein the means for reducing the amplitude of the luminance signal of the band of the color sub-carrier frequency comprises:
   a band pass filter for filtering the luminance signal,
   a coefficient multiplier for reducing by half the amplitude of the luminance signal filtered by the band pass filter, and
   a subtracter for subtracting an output of the coefficient multiplier from the output of the subtracter.

5. A signal separating apparatus comprising:
   a first delay element for delaying a composite video signal by one horizontal scanning period,
   a second delay element for delaying an output signal of the first delay element by one horizontal scanning period,
   plural band pass filters for selectively passing a band of a color sub-carrier frequency to develop first, second, and third output signals, the first output signal being developed from the composite video signal, the second output signal being developed from the first delay element and the third output signal being developed from the second delay element, respectively,
   inverter circuits for inverting said first and third output signals,
   a medium value calculator directly inputting the inverted first output signal, the second output signal, and the inverted third output signal, said medium value calculator comprising a medium value detector for detecting the output signal having a medium value from among the output signals input to said medium value calculator,
   an adder for adding the output signal of the medium value calculator and the output signal of the band pass filter filtering the output signal of said first delay element,
   a coefficient multiplier for reducing by half an amplitude of an output signal of the adder, and
   a subtracter for outputting a luminance signal by subtracting an output signal of the coefficient multiplier from the output signal of the first delay element.

6. A signal separating apparatus comprising:
   a first delay element for delaying a composite video signal by one horizontal scanning period,
   a second delay element for delaying an output signal of said first delay element by one horizontal scanning period,
   plural band pass filters for selectively passing a band of color sub-carrier frequency from the composite video signal, the output signal of the first delay element and an output signal of the second delay element, respectively,
   inverter circuit for inverting the output signal of the first delay element,
   a medium value calculator for outputting a signal having a medium value from among the output signal of the band pass filter filtering the composite video signal, the inverted output signal of the band pass filter filtering the output signal of the first delay element, and the output signal of the band pass filter filtering the output signal of the second delay element, and an adder for outputting a luminance signal by adding the medium value signal to the output signal of the first delay element.

7. A signal separating apparatus in accordance with claim 6, wherein the medium value calculator comprises:

plural comparators each for comparing levels of two signals selected from among the output signal of the band pass filter filtering the composite video signal, the inverted output signal of the band pass filter filtering the output signal of the first delay element, and the output signal of the band pass filter filtering the output signal of the second delay element, a medium value detector for detecting which compared signal is a medium value based on comparator output signals, and switching means for selecting the output signal which is the medium value signal based on a medium value detector output signal.

8. A signal separating apparatus in accordance with claim 6, wherein means for reducing amplitude of a luminance signal of the band of the color sub-carrier frequency connected to an output of the adder.

9. A signal separating apparatus in accordance with claim 8, wherein the means for reducing the amplitude of the luminance signal of the band of the color sub-carrier frequency comprises:

a band pass filter selectively passing the band of the color sub-carrier frequency, a coefficient multiplier for reducing by half the amplitude of the luminance signal filtered by the band pass filter, and a subtracter for subtracting an output of the coefficient multiplier from an output of the adder.

10. A signal separating apparatus comprising:

a first delay element for delaying a composite video signal by one horizontal scanning period, a second delay element for delaying an output signal of said first delay element by one horizontal scanning period, plural band pass filters for selectively passing a band of color sub-carrier frequency to develop first, second, and third output signals, the first output signal being developed from the composite video signal, the second output signal being developed from the first delay element and the third output signal being developed from the second delay element, respectively, inverter circuit for inverting the second output signal, a medium value calculator directly inputting the first output signal, the inverted second output signal, and the third output signal, said medium value calculator comprising a medium value detector for detecting the output signal having a medium value from among the output signals input to said medium value calculator, a first adder for adding the output signal of the medium value calculator and the inverted output of the band pass filter filtering the output of the first delay element, a coefficient multiplier for reducing by half an amplitude of the output of the adder, and a second adder for outputting a luminance signal by adding an output signal of the coefficient multiplier to the output signal of the first delay element.

11. A signal separating apparatus comprising:

a first delay element for delaying a composite video signal by one horizontal scanning period;

a second delay element for delaying an output signal of the first delay element by one horizontal scanning period, plural band pass filters for selectively passing a band of a color sub-carrier frequency from the composite video signal, the output signal of the first delay element and an output signal of the second delay element, respectively, inverter circuits for inverting output signals of the band pass filters filtering the composite video signal and the output signal of the second delay element, respectively, a first medium value calculator for outputting a signal having a first medium value from among the inverted output signal of the band pass filter filtering the composite video signal, output signal of the band pass filter filtering an output signal of the first delay element, and the inverted output signal of the band pass filter filtering the output signal of the second delay element, a first adder for adding the output signal of the first medium value calculator and the output signal of the band pass filter filtering the output signal of said first delay element, a first coefficient multiplier for reducing by half an amplitude of an output signal of the adder, a first subtracter for outputting a luminance signal by subtracting an output signal of the first coefficient multiplier from the output signal of the first delay element;

a second medium value calculator for outputting a signal having a second medium value from among the output signal of the band pass filter filtering the composite video signal, the output signal of the band pass filter filtering an output signal of the first delay element, and the output signal of the band pass filter filtering the output signal of the second delay element, a second subtracter for subtracting the second medium value signal from the output signal of the first delay element, and a second coefficient multiplier for reducing by half an amplitude of an output signal of the subtract to output a chrominance signal.

12. A signal separating apparatus comprising:

a first delay element for delaying a composite video signal by one horizontal scanning period, a second delay element for delaying an output signal of the first delay element by one horizontal scanning period, plural band pass filters for selectively passing a band of color sub-carrier frequency from the composite video signal, the output signal of the first delay element and an output signal of the second delay element, respectively, inverter circuits for inverting the output signal of the first delay element, a first medium value calculator for outputting a signal having a first medium value from among the output signal of the band pass filter filtering the composite video signal, the inverted output signal of the band pass filter filtering the output signal of the first delay element, and the output signal of the band pass filter filtering the output signal of the second delay element, a first adder for adding the first medium value signal and the inverted output signal of the band pass filter filtering the output signal of the band pass filter filtering the output signal of the first delay element, a first coefficient multiplier for reducing by half an amplitude of the output of the first adder, a second adder for outputting a luminance signal by adding an output signal of the first coefficient multiplier to the output signal of the first delay element, a second medium value calculator for outputting a signal having a second medium value from among the output signal of the band pass filter filtering the composite video signal, the output signal of the band pass filter filtering an output signal of the first delay element, and the output signal of the band pass filter filtering the output signal of the second delay element, a second subtracter for subtracting the second medium value signal from the output signal of the first delay element, and a second coefficient multiplier for reducing by half an amplitude of an output signal of the subtract to output a chrominance signal.

* * * * *